US012483487B2

(12) United States Patent
Berrada et al.

(10) Patent No.: US 12,483,487 B2
(45) Date of Patent: Nov. 25, 2025

(54) USING NETWORK TRAFFIC DATA TO IDENTIFY INTERNET OF THINGS DEVICES

(71) Applicant: The Nielsen Company (US), LLC, New York, NY (US)

(72) Inventors: Meryem Berrada, Oldsmar, FL (US); Holly McCoy, Oldsmar, FL (US); Oscar Blanco, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/391,153

(22) Filed: Dec. 20, 2023

(65) Prior Publication Data

US 2025/0211502 A1 Jun. 26, 2025

(51) Int. Cl.
*H04L 43/026* (2022.01)
*H04L 41/16* (2022.01)

(52) U.S. Cl.
CPC ............ *H04L 43/026* (2013.01); *H04L 41/16* (2013.01)

(58) Field of Classification Search
None
See application file for complete search history.

(56) References Cited

U.S. PATENT DOCUMENTS

| 2017/0109995 A1* | 4/2017 | Ueno ................. G05B 19/4184 |
| 2020/0358794 A1* | 11/2020 | Vasseur ................. G06F 16/285 |
| 2024/0333613 A1* | 10/2024 | Naik ..................... H04L 43/026 |
| 2025/0065915 A1* | 2/2025 | Petrin ............... B60W 60/0015 |

* cited by examiner

*Primary Examiner* — William G Trost, IV
*Assistant Examiner* — Christopher P Cadorna

(57) ABSTRACT

In one example, a method is described. The method includes: obtaining network traffic data characterizing network activity of devices coupled to a network at a media exposure measurement location, processing the network traffic data to generate, for each of multiple devices: activity parameters, each characterizing a network activity of the device, processing the activity parameters using an IoT classification model that includes a decision tree having: (i) multiple internal nodes, each internal node associated with an activity parameter threshold, and (ii) multiple leaf nodes, each leaf node associated with either the IoT device type or the other device type, based on the decision tree, selecting, from the device identifiers included in the network traffic data, a target device identifier corresponding to a leaf node in the decision tree that is associated with the IoT device type, and outputting the target device identifier.

20 Claims, 4 Drawing Sheets

USING NETWORK TRAFFIC DATA TO IDENTIFY INTERNET OF THINGS DEVICES

FIELD OF THE DISCLOSURE

This disclosure relates generally to media monitoring and, more particularly, to methods, systems, and articles of manufacture for monitoring and analyzing network traffic data to identify certain types of devices associated with a location where consumers are exposed to media.

USAGE AND TERMINOLOGY

In this disclosure, unless otherwise specified and/or unless the particular context clearly dictates otherwise, the terms "a" or "an" mean at least one, and the term "the" means the at least one.

Unless specifically stated otherwise, descriptors such as "first," "second," "third," etc., are used herein without imputing or otherwise indicating any meaning of priority, physical order, arrangement in a list, and ordering in any way, but are merely used as labels or arbitrary names to distinguish elements for ease of understanding the disclosed examples. In some examples, the descriptor "first" can be used to refer to an element in the detailed description, while the same element can be referred to in a claim with a different descriptor such as "second" or "third." In such instances, it should be understood that such descriptors are used merely for identifying those elements distinctly that might, for example, otherwise share the same name.

As used herein, the phrase "communicatively coupled," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, the term "computer program," can generally refer to a program suitable for use in any type of computing environment that can be written in any form of programming language. e.g., compiled or interpreted languages, or declarative or procedural languages. A computer program can be deployed to be executed on one computer or on multiple computers that are located at one site or distributed across multiple sites and interconnected by any appropriate type of data communication network. Generally, a program can be deployed in any form, e.g., as a standalone program or as a module, component, subroutine, or other unit suitable for use in a computing environment. In some cases, the term "computer program" can also be described as a software, a software application, an app, a module, a software module, a script, or a code. In some cases, a computer program can correspond to a file in a file system. For example, a computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

SUMMARY

This specification generally describes systems and methods that can identify devices of a particular device type from a set of devices at a residential household where consumers are exposed to media. In one example, the consumers can be exposed to digital media through streaming via a network (e.g., the Internet) to any appropriate device having streaming capabilities, e.g., connected television, desktop computers, or any other appropriate device.

The systems and methods described in this specification can analyze network traffic data associated with the set of devices at the residential household to identify which device can be classified as an Internet of Things (IoT) device, e.g., a device such as a smart thermostat that is connected to the network at the household but, in some cases, might not have streaming (e.g., video streaming) capabilities. By filtering out the IoT devices from the set of devices associated with the household, the systems and methods described in this specification can accurately isolate only those devices (e.g., televisions, desktop and laptop computers, mobile phones, etc.) that are substantially relevant for tracking digital media consumption by consumers.

In a first aspect a method for using network traffic to identify Internet of Things (IoT) devices at a media exposure measurement location is described. The method includes: obtaining network traffic data characterizing network activity of devices coupled to a network at the media exposure measurement location. The network traffic data can include, for each of multiple devices, a respective device identifier of the device.

The method further includes: processing the network traffic data to generate, for each of the devices: multiple activity parameters, each characterizing a network activity of the device at the media exposure measurement location.

The method further includes: processing the activity parameters using an IoT classification model that is configured to classify each of multiple devices identified in the network traffic data as either an IoT device type or another device type. The IoT classification model includes a decision tree having: (i) multiple internal nodes, each internal node associated with an activity parameter threshold corresponding to a respective one of multiple activity parameters, and (ii) multiple leaf nodes, each leaf node associated with either the IoT device type or the other device type.

The method further includes: based on the decision tree, selecting, from multiple device identifiers included in the network traffic data, a target device identifier corresponding to a leaf node in the decision tree that is associated with the IoT device type, and outputting the target device identifier.

In a second aspect, there is provided a non-transitory computer-readable storage medium, having stored thereon machine-readable instructions that, upon execution by a processor, cause performance of operations of any preceding aspect.

In a third aspect, there is provided a computing system that includes: a processor, and a non-transitory computer-readable storage medium, having stored thereon machine-readable instructions that, upon execution by the processor, cause performance of operations of any preceding aspect.

DETAILED DESCRIPTION

I. Overview

Figure 1:
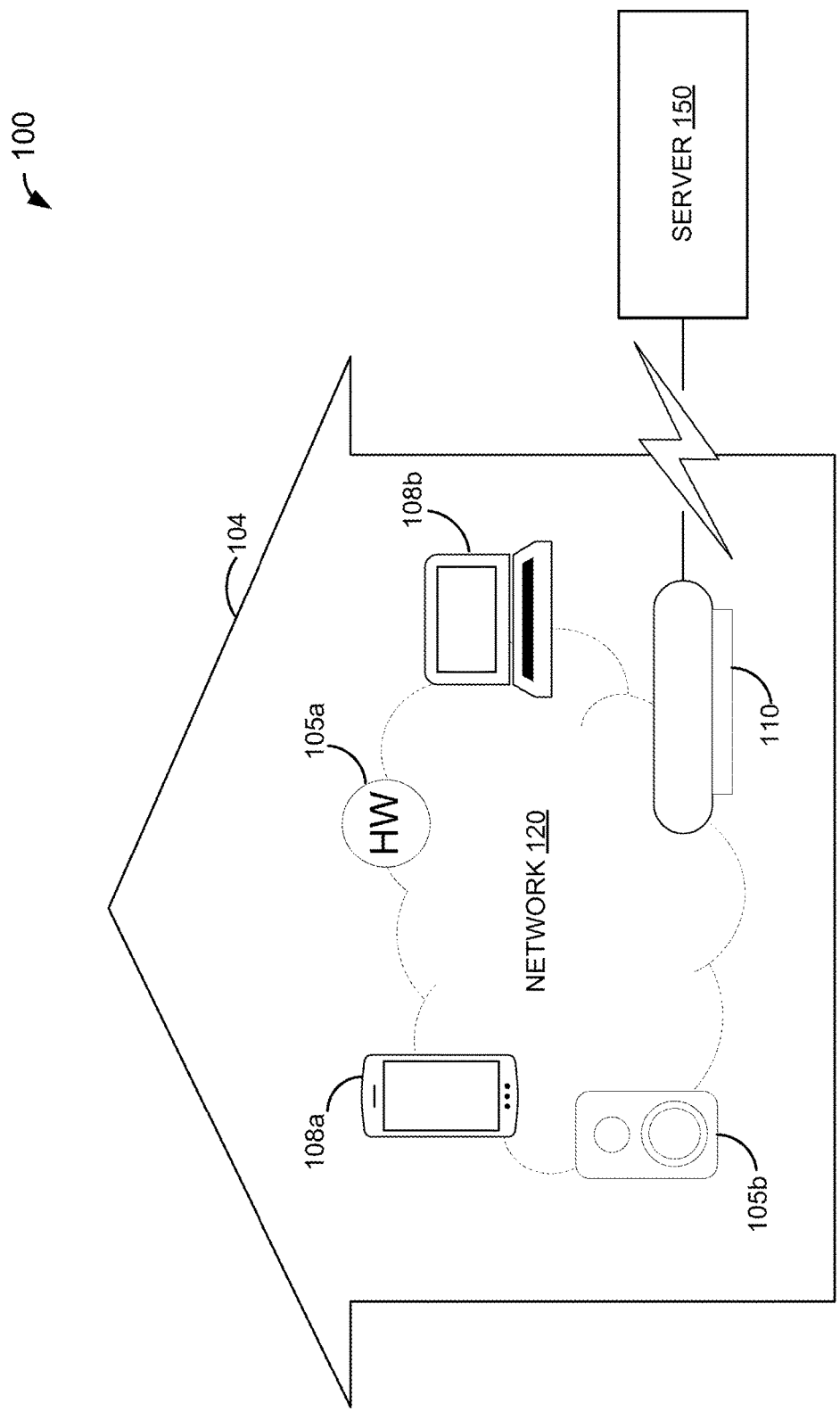
FIG. 1 is an illustration of an example IoT device identification system in which various described operations can be implemented.

Audience Measurement Entities (AMEs) are entities that collect data about media consumption by consumers, referred to herein as "media exposure data," for various purposes. Generally, media exposure data can characterize who is consuming media and what type of media is being consumed. In one example, media exposure data can include data that identifies media (e.g., metadata, codes, signatures, watermarks, etc.), data that identifies consumers (demographic information, usernames, etc.) and, in some cases, data that identifies means by which the media was presented to the consumer (e.g., an identifier of an application, time/duration of use of the application, etc.). Media exposure data collected by the AMEs can be used by other entities such as advertisers to improve the effectiveness of their advertising campaigns, and broadcasters to gain a deeper insight into channel viewership.

Throughout this specification, the term "media" can refer to any type of content item (e.g., television programs, movies, websites, etc.) delivered to a consumer via any appropriate distribution channel, e.g., television, radio, publishing/streaming via the Internet, or any other appropriate distribution channel. The term "digital media" can refer to a subset of media that includes those content items that are accessible via the Internet. As a particular example, digital media can be streamed via the Internet to devices such as desktop and laptop computers, tablets, mobile phones, and Connected Television (CTV).

AMEs can collect media exposure data for digital media by using a streaming meter. Throughout this specification, a "streaming meter" can refer to a device that can be coupled to a network at a consumer household and can monitor network traffic to collect network traffic data. The streaming meter can be in the form of a separate unit (e.g., separate from a modem, a router, or any other network access device at the consumer household), can be installed at any appropriate location in the consumer household, and can be coupled to any other device at the household through a wired, or wireless, connection. For example, the streaming meter can be coupled to an Internet access point (e.g., a router) and can monitor network traffic passing through the access point. Generally, "network traffic data" can include a variety of different network traffic features and device identifiers associated with devices coupled to a network. The device identifiers can include, e.g., IP addresses. MAC addresses, and any other appropriate device identifiers. The network traffic features can include, e.g., URLs, domain names, user agents, Multipurpose Internet Mail Extension (MIME) types, bandwidth, and any other appropriate network traffic features.

By monitoring network traffic using the streaming meter, AMEs collect media exposure data which can then be used by advertisers, broadcasters, and other entities, for various purposes, as described above.

AMEs enroll consumers who consent to being monitored into a registered consumer panel. Then, AMEs can install and maintain various media monitoring and media tracking equipment, including streaming meters, in registered panelist's households. As part of the enrollment process, AMEs can collect various types of information directly from the consumers about their household, e.g., types of devices used by the consumers to access media at the household, demographic information about the consumers (e.g., age, gender, etc.), and any other appropriate information. This information obtained directly from the consumers can form a part of the media exposure data collected by the AMEs, as described above.

In some cases. AMEs can associate data collected directly from consumers, e.g., during consumer enrollment into the panel, with one or more network traffic features and device identifiers collected by the streaming meter by monitoring network traffic data at the residential household. As a particular example, AMEs can associate a MAC address of a device at the residential household specified by the network traffic data with demographic information about the consumer who owns and/or uses the device, as indicated by the information provided directly by the consumer during enrollment into the panel. In this manner, the AMEs can generate the media exposure data that provides a mapping between the media being consumed through the device at the residential household and the demographic information of the consumer who is exposed to media through the device.

However, in some cases, the residential households of consumers can include many different types of devices connected to the network, where some of these devices might not normally be used by the consumers for digital media exposure. Throughout this disclosure, these types of devices can be referred to as "Internet of Things (IoT)" devices and can generally include any hardware device that can be coupled to the network at the residential household. In one example, the IoT devices can be consumer IoT devices configured for everyday use such as, e.g., home appliances, voice assistants, wearables, light fixtures, smart speakers, smart thermostats, and other consumer IoT devices. In another example, the IoT devices can be commercial IoT devices configured for healthcare and transportation applications such as, e.g., smart pacemakers, self-driving cars, and other commercial IoT devices.

The systems and methods described in this specification can analyze the network traffic data associated with the set of devices at the residential household to identify which devices can be classified as IoT devices. The systems and methods can filter out the IoT devices from the set of devices specified in the network traffic data to leave only those devices that are used by the consumers at the residential household to access digital media. In this manner, the systems and methods can provide accurate recommendations for mapping MAC addresses specified in the network traffic data with information about the consumers obtained during enrollment into the panel. By automatically identifying and filtering out the IoT devices from the set of devices specified in the network traffic data, the systems and methods described in this specification can provide device mappings with greater accuracy and using fewer computational resources (e.g., memory and computing power) than other conventional systems. Moreover. AMEs can use the mappings to generate media exposure data with greater accuracy, thereby allowing broadcasters and advertisers to make effective advertising/media inventory optimization decisions.

II. IoT Device Identification System Architecture

FIG. 1 illustrates an example IoT device identification system 100 in which various described operations can be implemented. The system 100 includes a media exposure measurement location 104, e.g., a residential household of a consumer who is a registered panelist with an AME, or any other appropriate location where consumers are exposed to media.

The media exposure measurement location 104 can include different types of devices coupled to a network 120 at the location. The network 120 can be. e.g., a local area network (LAN), a wide area network (WAN) (e.g., the Internet), or any other appropriate type of network. The devices at the media exposure measurement location 104 can include IoT devices, e.g., a smart thermostat 105*a* and a smart speaker 105*b*, and other devices that consumers at the location 104 can use to access digital media, e.g., a mobile device 108*a* and a laptop computer 108*b*. The examples of devices in FIG. 1 are provided for illustrative purposes only.

As described above. AMEs can collect media exposure data for digital media by using a streaming meter 110. The streaming meter 110 is coupled to the network 120 at the location 104 and is configured to monitor network traffic to collect network traffic data. For example, the streaming meter 110 can be coupled to an Internet access point (e.g., a router) and can monitor network traffic passing through the access point. Generally, the streaming meter 110 can be coupled to the network 120 and configured to monitor the network traffic in any appropriate manner.

As described above, the network traffic data can include, for each of multiple devices coupled to the network 120 at the media exposure measurement location 104, a respective device identifier of the device and multiple network traffic features that can characterize network activity of the device over a predefined length of time. The network traffic features can include, e.g., a user agent, a domain name, bandwidth, or any other appropriate network traffic features. Generally, the network traffic data can include any appropriate number and type of network traffic features.

The term "user agent" can refer to an identification of an application and/or software used to access digital media. A user agent can specify, e.g., a type of browser used to access the digital media, a type of operating system installed on the device used to access the digital media, and/or any other appropriate parameter or combination of parameters. The term "domain name" can refer to, e.g., a unique address that is used to access a webpage through a browser. The term "bandwidth" can refer to, e.g., a rate of data transfer through the network 120.

The IoT device identification system 100 can process the network traffic features to generate multiple activity parameters, each characterizing a network activity of the device at the media exposure measurement location 104 over a predefined length of time. The activity parameters can include: (i) a user agent count. (ii) a domain name count, and (iii) an average bandwidth. Generally, the length of time can include any appropriate length of time, e.g., 24 hours, 1 day, 7 days, 14 days, or 30 days.

As a particular example, to generate the user agent count activity parameter, the IoT device identification system 100 can process the network traffic features included in the network traffic data measured by the streaming meter 110 over a length of time to determine a number of instances that a particular user agent is present. Similarly, to generate the domain name count activity parameter, the system 100 can process the network traffic features included in the network traffic data measured by the streaming meter 110 over a length of time to determine a number of instances that a particular domain name is present. To generate the average bandwidth activity parameter, the system 100 can process the network traffic features included in the network traffic data measured by the streaming meter 110 over a length of time to determine an average rate of data transfer over that length of time.

The system 100 can perform this process for each device identifier, or a select number of device identifiers, included in the network traffic data representing a respective device coupled to the network 120 at the media exposure measurement location 104. In some cases, the length of time over which one activity parameter is determined can be different from a length of time over which another activity parameter is determined. For example, the system 100 can determine the domain name count activity parameter by processing network traffic features collected by the streaming meter 110 over a first length of time, and the average bandwidth activity parameter by processing network traffic features measured by the streaming meter 110 over a second, different, length of time.

The IoT device identification system 100 can further include a server 150 that can be implemented by one or more computers located in one or more locations. In one example, the server 150 can be located remotely from the media exposure measurement location 104, and can be operated by an AME. The server 150 can be communicatively coupled to the streaming meter 110 and can be configured to receive the network traffic data from the streaming meter 110. The server 150 can communicate with the streaming meter 110 in any appropriate manner, such as through Internet messages (e.g., a HyperText Transfer Protocol (I-TTP) request (s)) that include data obtained by the streaming meter 110. Other example modes of communication between the streaming meter 110 and the server 150 can include an HTTP Secure protocol (HTTPS), a file transfer protocol (FTP), a secure file transfer protocol (SFTP), or any other appropriate mode of communication.

The server 150 can process the activity parameters (e.g., the user agent count, the domain name count, and the average bandwidth, as described above) using an IoT classification model that can be implemented as computer programs on one or more computers located in one or more locations. The IoT classification model can include a decision tree and can be configured to classify each of multiple devices identified in the network traffic data measured by the streaming meter 110 as either an IoT device type or another device type. The term "decision tree" can refer to a hierarchical data structure that includes a root node, multiple internal nodes, multiple leaf nodes, and branches that connect the nodes in the decision tree. The root node in the decision tree is a node that does not have any incoming branches. The leaf node in the decision tree is a node that does not have any outgoing branches. The internal node in the decision tree is a node that has both incoming and outgoing branches. The root node can generally represent the beginning of a classification (e.g., decision-making) process represented by the tree, while each of the leaf nodes can represent a respective outcome of the classification process represented by the tree. An example IoT classification model and an example decision tree are described in more detail below with reference to FIG. 2.

Based on the decision tree, the server 150 can select from the network traffic data a target device identifier that corresponds to the IoT device type. The server 150 can output the target device identifier as the device identifier that corresponds to the IoT device (e.g., the smart thermostat 105*a*, or the smart speaker 105*b*) at the media exposure measurement location 104. In one example, the server 150 can output the target device identifier by presenting the target device identifier on a user interface of an application programming interface (API) made available by the server 150. In another example, the server 150 can output the target device identifier by transmitting the target device identifier to a computing device, a computing system, another server, or any other appropriate computing environment, for presentation on a user interface. In yet another example, the server 150 can output the target device identifier by storing the target device identifier in a database implemented by, e.g., a local memory, a volatile/non-volatile memory, a mass storage, or any other appropriate storage medium. The database can generally store data for the media exposure measurement location 104, which the AME can access to perform any of the operations described in this specification.

In some cases, the server 150 can remove the target device identifier corresponding to the IoT device type from the device identifiers included in the network traffic data collected by the streaming meter 110. In this manner, the server 150 can leave only those device identifiers specified in the network traffic data that correspond to devices that can be used by the consumers at the media exposure measurement location 104 to access digital media, e.g., the laptop computer 108b, or the mobile device 108a. The server 150 can output the remaining device identifiers included in the network traffic data (e.g., with the target device identifier filtered out) by presenting the device identifiers on a user interface of an API made available by the server 150, or in any other appropriate manner.

Although a decision tree is described herein for use by the IoT classification model to classify devices as either an IoT device type or another device type, it should be understood that in other implementations, the IoT classification model can be configured according to any appropriate algorithm, e.g., any type of classification or regression algorithm, or any other appropriate algorithm. In some implementations, the IoT classification model can be configured to perform any other operations in addition to the classification into the IoT device type or other device type. For example, the IoT classification model can be configured to process the network traffic data (e.g., the network traffic features included in the network traffic data) collected by the streaming meter 110 to generate the activity parameters, in a similar manner as described above. Generally, the IoT classification model can have any appropriate architecture that would enable it to perform the additional operations. An example decision tree included in the IoT classification model is described in more detail next.

Figure 2:
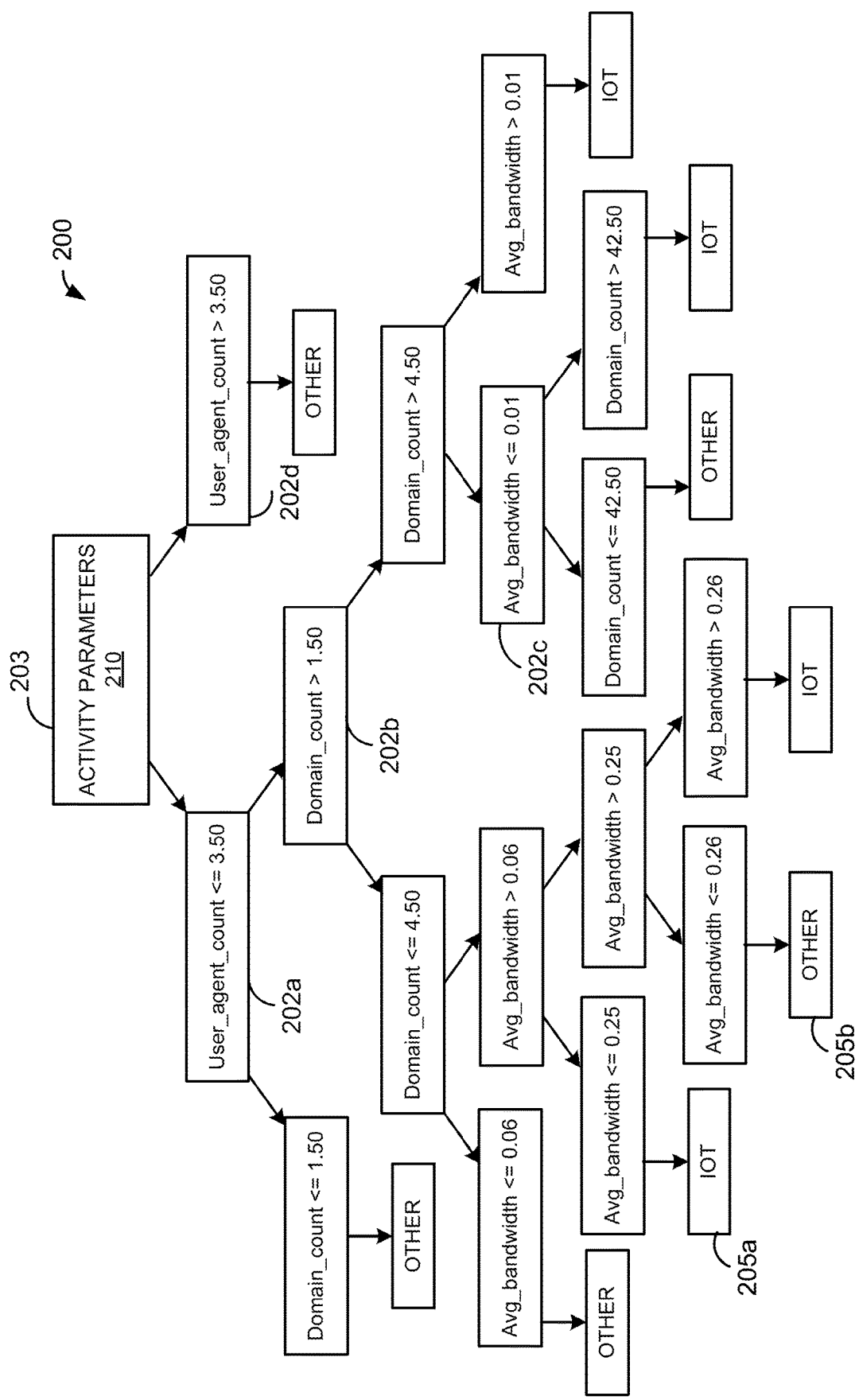
FIG. 2 is an illustration of an example decision tree.

FIG. 2 is an illustration of an example decision tree 200 included in the IoT classification model. As described above with reference to FIG. 1, the IoT classification model is configured to process, for each device identified by a device identifier in the network traffic data, activity parameters 210 to classify the device identifier as belonging to a device having either an IoT device type or another device type.

Specifically, the network traffic data can include, for each device coupled to a network, multiple network traffic features. The IoT device identification system 100 can process the network traffic features to generate multiple activity parameters 210, each characterizing a network activity of the device over a predefined length of time e.g., 24 hours, 1 day, 7 days, 14 days, 30 days, or any other appropriate length of time. The activity parameters can include: (i) a user agent count, (ii) a domain name count, and (iii) an average bandwidth.

The decision tree 200 included in the IoT classification model can include multiple nodes and branches connecting the nodes. Specifically, the decision tree 200 can include a root node 203 that corresponds to the activity parameters 210. The decision tree 200 can further include multiple internal nodes 202a, 202b, 202c, where each internal node has both incoming and outgoing branches. The decision tree 200 can further include multiple leaf nodes 205a, 205b, where each leaf node is a node that does not have any outgoing branches. The root node 203 in the decision tree 200 can generally represent the beginning of the classification process represented by the tree 200, while each of the leaf nodes 205a, 205b, can represent a respective outcome of the classification process represented by the tree 200.

Each internal node 202a, 202b, 202c, in the decision tree 200 can be associated with an activity parameter threshold corresponding to a respective one of multiple activity parameters. For example, as illustrated in FIG. 2, a first internal node 202a can be associated with a first activity parameter threshold that defines a threshold for the user agent count activity parameter. Accordingly, the first internal node 202a represents those device identifiers specified in the network traffic data that have user agent count less than or equal to (C=) 3.50.

A second internal node 202d can be associated with a second different activity parameter threshold that defines a threshold for the user agent count activity parameter. However, the second internal node 202d represents those device identifiers specified in the network traffic data that have a user agent count greater than (>) 3.50. The device identifiers represented by the second internal node 202d can correspond to those devices that have the capability to pass many different user agents such as, e.g., desktop/laptop computers. By contrast, the first internal node 202a specifies a lower user agent count and can accordingly represent device identifiers of those devices that can pass a smaller number of user agents, such as, e.g., a smart thermostat 105a that may only be able to pass a single user agent.

Similar considerations apply to the average bandwidth threshold and the domain count threshold represented by the internal nodes in the decision tree 200. In addition to the example activity characteristics of IoT devices described above, other typical network activity characteristics of IoT devices can include. e.g., bandwidth indicative of repeated updates, consistent and easily replicable domain activity, bandwidth indicative of prolonged or constant periods of active status, and generally low bandwidth. This is in contrast to devices that have digital media streaming capabilities (e.g., desktop/laptop computers, mobile phones, etc.), where the typical characteristics can include, e.g., many different domains, bandwidth that varies significantly over time, and generally high bandwidth. These and other network activity characteristics of IoT devices and other devices are captured by the different activity parameters thresholds in the decision tree 200.

Based on the decision tree 200 of the IoT classification model, the server 150 can select, from multiple device identifiers included in the network traffic data, a target device identifier corresponding to a leaf node in the decision tree 200 that is associated with the IoT device type. For example, the server 150 can select a target device identifier from the network traffic data that is represented by the leaf node 205a because this node is associated with the IoT device type. The server 150 can output the target device identifier as belonging to an IoT device (e.g., the smart thermostat 105a) at the media exposure measurement location 104.

In some cases, the server 150 can remove the target device identifier (e.g., represented by the leaf node 205a) corresponding to the IoT device type from the device identifiers included in the network traffic data. In this manner, the server 150 can leave only those device identifiers specified in the network traffic data that correspond to devices that can be used by the consumers at the media exposure measurement location 104 to access digital media, e.g., the laptop computer 108b, or the mobile device 108a.

In some cases, the server 150 can include a training engine that can train the IoT classification model using a supervised training technique and over multiple training iterations. That is, at each training iteration, the training engine can update at least some of the parameters of the IoT classification model. The training engine can train the IoT classification model on a training dataset that includes a set of training examples. Each training example can include: (i) a training input, and (ii) a target output. The target output can represent, e.g., the output that should be generated using the IoT classification model by processing the training input. In one example, the training input can include: (i) multiple training activity parameters, and (ii) multiple training device identifiers, and the training output can include (iii) target device types, such as an IoT device type and other device type.

At each training iteration, the training engine can sample a batch of training examples from the training dataset and use the IoT classification model to process the training inputs (e.g., training activity parameters and training device identifiers) to generate a corresponding classification for each of the training device identifiers as either IoT device type or other device type. The training engine can determine whether the IoT classification model correctly classified the training device identifiers by comparing the output of the IoT classification model to the target device types specified by the training examples. Based on the similarity, the training engine can adjust the parameter values of the IoT classification model. After training, the server 150 can use the trained IoT classification model to classify the device identifiers specified by the network traffic data that is collected by the streaming meter 110 at the media exposure measurement location 104.

Figure 3:
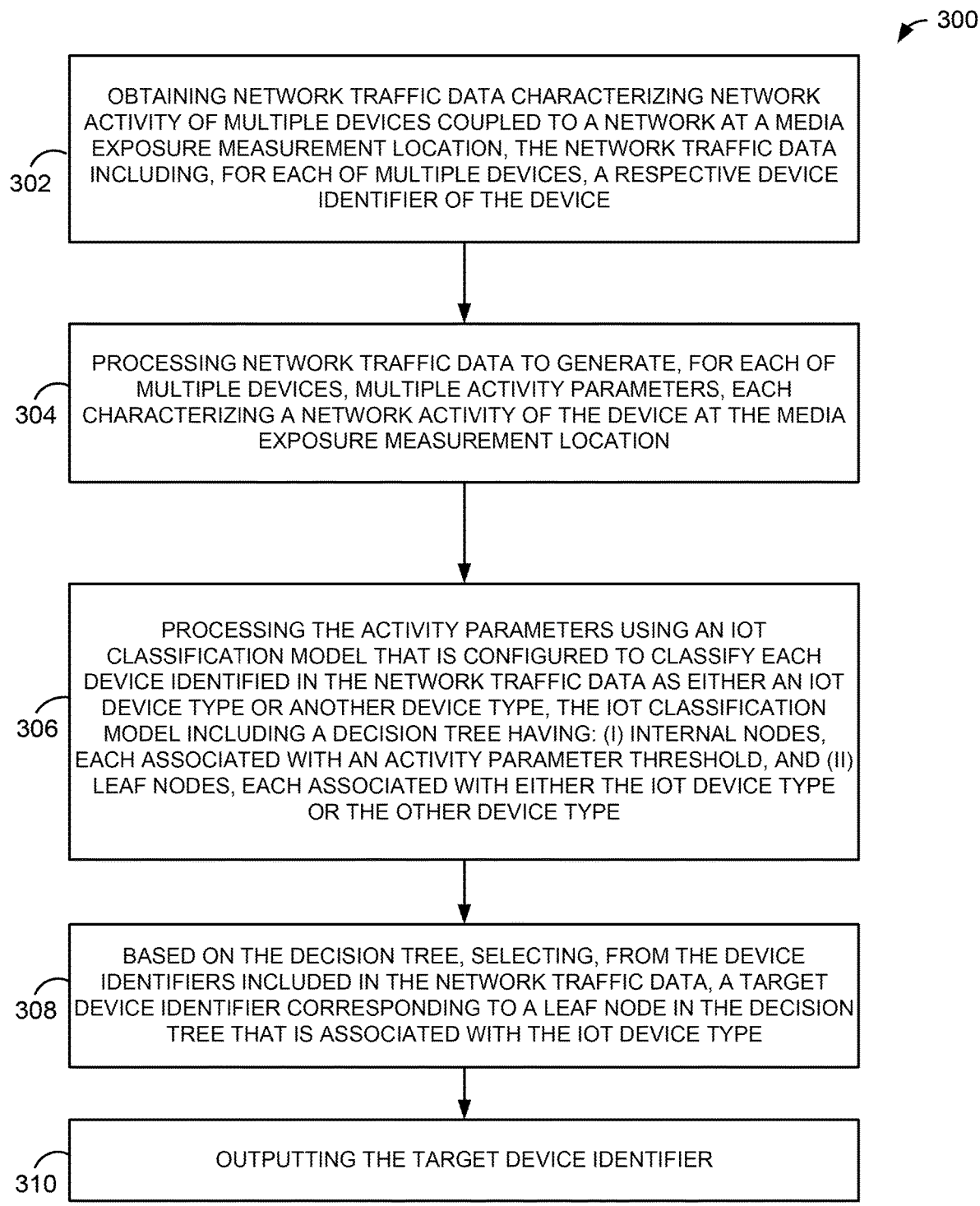
FIG. 3 is a flow chart of an example method.

FIG. 3 is a flow chart of an example method 300. Method 300 can be carried out by a system of one or more computers located in one or more locations. For example, the server 150 described above with reference to FIG. 1, appropriately programmed in accordance with the specification, can perform method 300.

At block 302, method 300 includes obtaining network traffic data. The network traffic data can characterize network activity of multiple devices coupled to a network at a media exposure measurement location. The network traffic data can include, for each of the devices, a respective device identifier of the device. In some implementations, the network traffic data can include, for each of multiple devices coupled to the network at the media exposure measurement location, multiple network traffic features characterizing network activity of the device over a predefined length of time. In such cases, the method 300 can further include: processing multiple network traffic features characterizing the network activity of the device to generate the activity parameters.

In some implementations, the network traffic data can be collected by a streaming meter that is located at the media exposure measurement location and that is communicatively coupled to the devices. In such cases, the streaming meter can be configured to monitor the network to collect the network traffic data.

At block 304, method 300 includes processing the network traffic data to generate, for each of the devices: multiple activity parameters, each characterizing a network activity of the device at the media exposure measurement location. The activity parameters can include, for example, a user agent count, a domain name count, and an average bandwidth.

At block 306, method 300 includes processing the activity parameters using an IoT classification model that is configured to classify each of multiple devices identified in the network traffic data as either an IoT device type or another device type. The IoT classification model can include a decision tree having: (i) multiple internal nodes, each internal node associated with an activity parameter threshold corresponding to a respective one of multiple activity parameters, and (ii) multiple leaf nodes, each leaf node associated with either the IoT device type or the other device type. In some implementations, the activity parameter threshold associated with each internal node in the decision tree can be a user agent count threshold, a domain count threshold, or an average bandwidth threshold.

At block 308, method 300 includes, based on the decision tree, selecting, from multiple device identifiers included in the network traffic data, a target device identifier corresponding to a leaf node in the decision tree that is associated with the IoT device type.

At block 310, method 300 includes outputting the target device identifier.

In some implementations, the method 300 can further include removing the target device identifier corresponding to the IoT device type from multiple device identifiers included in the network traffic data.

In some implementations, the IoT classification model can be trained using a training dataset that includes: (i) a plurality of training activity parameters, (ii) a plurality of training device identifiers, and (iii) target device types. As a particular example, the IoT classification model can be trained on the training dataset using a supervised learning technique.

III. Example Computing Device

Any one or more of the above-described components, such as the server 150, can take the form of a computing device, or a computing system that includes one or more computing devices.

Figure 4:
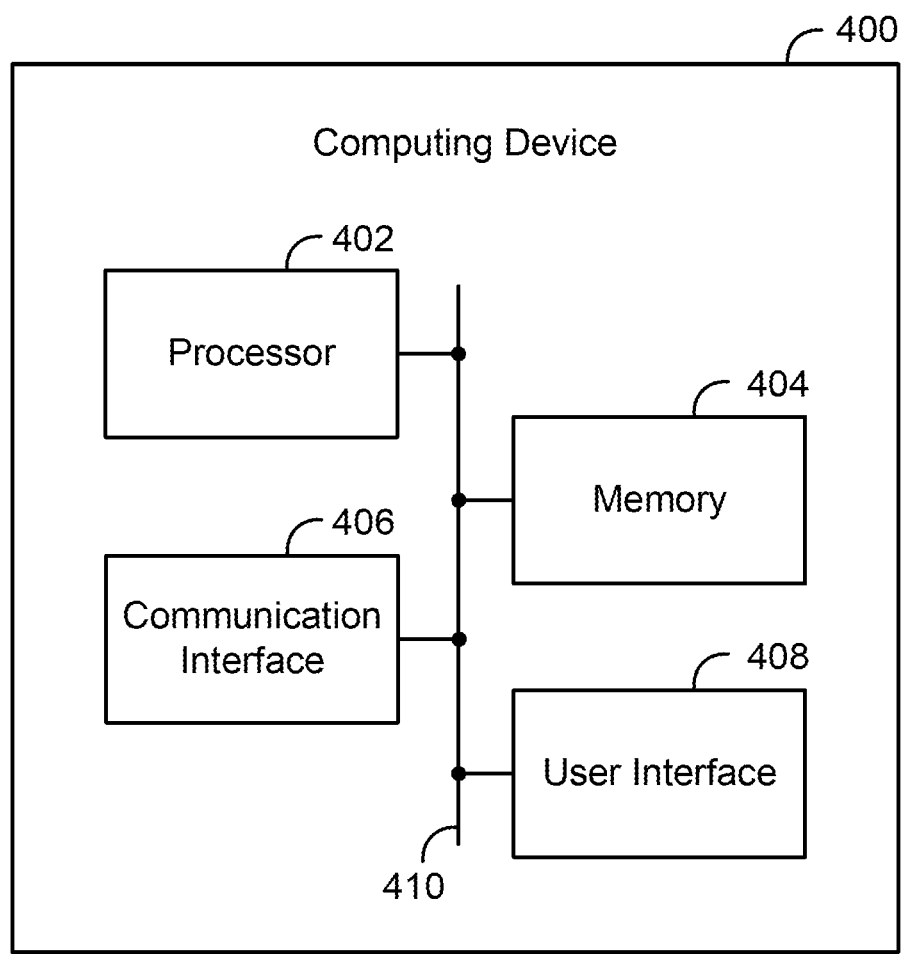
FIG. 4 is a simplified block diagram of an example computing device.

FIG. 4 is a simplified block diagram of an example computing device 400. The computing device 400 can be configured to perform one or more operations, such as the operations described in this disclosure. As shown, the computing device 400 can include various components, such as a processor 402, memory 404, a communication interface 406, and/or a user interface 408. These components can be connected to each other (or to another device, system, or other entity) via a connection mechanism 410.

The processor 402 can include one or more general-purpose processors and/or one or more special-purpose processors.

Memory 404 can include one or more volatile, non-volatile, removable, and/or non-removable storage components, such as magnetic, optical, or flash storage, and/or can be integrated in whole or in part with the processor 402. Further, memory 404 can take the form of a non-transitory computer-readable storage medium, having stored thereon computer-readable program instructions (e.g., compiled or non-compiled program logic and/or machine code) that, upon execution by the processor 402, cause the computing device 400 to perform one or more operations, such as those described in this disclosure. The program instructions can define and/or be part of a discrete software application. In some examples, the computing device 400 can execute the program instructions in response to receiving an input (e.g., via the communication interface 406 and/or the user interface 408). Memory 404 can also store other types of data, such as those types described in this disclosure. In some examples, memory 404 can be implemented using a single physical device, while in other examples, memory 404 can be implemented using two or more physical devices.

The communication interface 406 can include one or more wired interfaces (e.g., an Ethernet interface) or one or more wireless interfaces (e.g., a cellular interface. Wi-Fi interface, or Bluetooth® interface). Such interfaces allow the computing device 400 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 408 can facilitate interaction between computing device 400 and a user of computing device 400, if applicable. As such, the user interface 408 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 408 can include hardware and/or software components that facilitate interaction between the computing device 400 and the user of the computing device 400.

The connection mechanism 410 can be a cable, system bus, computer network connection, or other form of a wired or wireless connection between components of the computing device 400.

One or more of the components of the computing device 400 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 400 can be combined into a single component, and the function described herein for a single component can be subdivided among multiple components.

IV. Example Variations

Although the examples and features described above have been described in connection with specific entities and specific operations, in some scenarios, there can be many instances of these entities and many instances of these operations being performed, perhaps contemporaneously or simultaneously, on a large-scale basis.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for using network traffic to identify Internet of Things (IoT) devices at a media exposure measurement location, the method comprising:
    obtaining network traffic data characterizing network activity of a plurality of devices coupled to a network at the media exposure measurement location, the network traffic data comprising, for each of the plurality of devices, a respective device identifier of the device;
    processing the network traffic data to generate, for each of the plurality of devices: a plurality of activity parameters, each characterizing a network activity of the device at the media exposure measurement location;
    processing the plurality of activity parameters using an IoT classification model that is configured to classify each of the plurality of devices identified in the network traffic data as either an IoT device type or another device type, the IoT classification model comprising a decision tree having: (i) a plurality of internal nodes, each internal node associated with an activity parameter threshold corresponding to a respective one of the plurality of activity parameters, and (ii) a plurality of leaf nodes, each leaf node associated with either the IoT device type or the other device type;
    based on the decision tree, selecting, from a plurality of device identifiers included in the network traffic data, a target device identifier corresponding to a leaf node in the decision tree that is associated with the IoT device type;
    filtering out the target device identifier corresponding to the IoT device type from the device identifiers included in the network traffic data to determine at least one remaining device identifier, wherein the at least one remaining device identifier corresponds to a device of the plurality of devices configured to be used for media streaming, and
    outputting the at least one remaining device identifier that corresponds to the device configured to be used for media streaming.

2. The method of claim 1, wherein the network traffic data comprises, for each of the plurality of devices coupled to the network at the media exposure measurement location, a plurality of network traffic features characterizing the network activity of the device over a predefined length of time, and wherein the method further comprises:
processing the plurality of network traffic features to generate the plurality of activity parameters.

3. The method of claim 1, wherein the plurality of activity parameters comprise:
(i) a user agent count;
(ii) a domain name count; and
(iii) an average bandwidth.

4. The method of claim 1, wherein the activity parameter threshold associated with each internal node in the decision tree is a user agent count threshold, a domain count threshold, or an average bandwidth threshold.

5. The method of claim 1, wherein the network traffic data is collected by a streaming meter that is located at the media exposure measurement location and that is communicatively coupled to the plurality of devices, and wherein the streaming meter is configured to monitor the network to collect the network traffic data.

6. The method of claim 1, wherein the IoT classification model is trained using a training dataset comprising: (i) a plurality of training activity parameters, (ii) a plurality of training device identifiers, and (iii) target device types.

7. The method of claim 6, wherein the IoT classification model is trained on the training dataset using a supervised learning technique.

8. A computing system comprising:
a processor; and
a non-transitory computer-readable storage medium, having stored thereon program instructions that, upon execution by the processor, cause performance of operations for using network traffic to identify Internet of Things (IoT) devices at a media exposure measurement location, the operations comprising:
obtaining network traffic data characterizing network activity of a plurality of devices coupled to a network at the media exposure measurement location, the network traffic data comprising, for each of the plurality of devices, a respective device identifier of the device;
processing the network traffic data to generate, for each of the plurality of devices: a plurality of activity parameters, each characterizing a network activity of the device at the media exposure measurement location;
processing the plurality of activity parameters using an IoT classification model that is configured to classify each of the plurality of devices identified in the network traffic data as either an IoT device type or another device type, the IoT classification model comprising a decision tree having: (i) a plurality of internal nodes, each internal node associated with an activity parameter threshold corresponding to a respective one of the plurality of activity parameters, and (ii) a plurality of leaf nodes, each leaf node associated with either the IoT device type or the other device type;
based on the decision tree, selecting, from a plurality of device identifiers included in the network traffic data, a target device identifier corresponding to a leaf node in the decision tree that is associated with the IoT device type;
filtering out the target device identifier corresponding to the IoT device type from the device identifiers included in the network traffic data to determine at least one remaining device identifier, wherein the at least one remaining device identifier corresponds to a device of the plurality of devices configured to be used for media streaming; and
outputting the at least one remaining device identifier that corresponds to the device configured to be used for media streaming.

9. The system of claim 8, wherein the plurality of activity parameters comprise:
(i) a user agent count;
(ii) a domain name count; and
(iii) an average bandwidth.

10. The system of claim 8, wherein the activity parameter threshold associated with each internal node in the decision tree is a user agent count threshold, a domain count threshold, or an average bandwidth threshold.

11. The system of claim 8, wherein the network traffic data is collected by a streaming meter that is located at the media exposure measurement location and that is communicatively coupled to the plurality of devices, and wherein the streaming meter is configured to monitor the network to collect the network traffic data.

12. The system of claim 8, wherein the IoT classification model is trained using a training dataset comprising: (i) a plurality of training activity parameters, (ii) a plurality of training device identifiers, and (iii) target device types.

13. The system of claim 12, wherein the IoT classification model is trained on the training dataset using a supervised learning technique.

14. A non-transitory computer-readable storage medium, having stored thereon program instructions that, upon execution by a processor, cause performance of operations for using network traffic to identify Internet of Things (IoT) devices at a media exposure measurement location, the operations comprising:
obtaining network traffic data characterizing network activity of a plurality of devices coupled to a network at the media exposure measurement location, the network traffic data comprising, for each of the plurality of devices, a respective device identifier of the device;
processing the network traffic data to generate, for each of the plurality of devices: a plurality of activity parameters, each characterizing a network activity of the device at the media exposure measurement location;
processing the plurality of activity parameters using an IoT classification model that is configured to classify each of the plurality of devices identified in the network traffic data as either an IoT device type or another device type, the IoT classification model comprising a decision tree having: (i) a plurality of internal nodes, each internal node associated with an activity parameter threshold corresponding to a respective one of the plurality of activity parameters, and (ii) a plurality of leaf nodes, each leaf node associated with either the IoT device type or the other device type;
based on the decision tree, selecting, from a plurality of device identifiers included in the network traffic data, a target device identifier corresponding to a leaf node in the decision tree that is associated with the IoT device type;
filtering out the target device identifier corresponding to the IoT device type from the device identifiers included in the network traffic data to determine at least one remaining device identifier, wherein the at least one remaining device identifier corresponds to a device of the plurality of devices configured to be used for media streaming; and outputting the at least one remaining device identifier that corresponds to the device configured to be used for media streaming.

15. The non-transitory computer-readable storage medium of claim 14, wherein the plurality of activity parameters comprise:
(i) a user agent count;
(ii) a domain name count; and
(iii) an average bandwidth.

16. The non-transitory computer-readable storage medium of claim 14, wherein the activity parameter threshold associated with each internal node in the decision tree is a user agent count threshold, a domain count threshold, or an average bandwidth threshold.

17. The non-transitory computer-readable storage medium of claim 14, wherein the network traffic data is collected by a streaming meter that is located at the media exposure measurement location and that is communicatively coupled to the plurality of devices, and wherein the streaming meter is configured to monitor the network to collect the network traffic data.

18. The method of claim 1, comprising:
based on the at least one remaining device identifier, determining a mapping between media streamed through the device and demographic information of a consumer who is exposed to the media streamed through the device.

19. The system of claim 8, wherein the operations further comprise:
based on the at least one remaining device identifier, determining a mapping between media streamed through the device and demographic information of a consumer who is exposed to the media streamed through the device.

20. The non-transitory computer-readable storage medium of claim 14, wherein the operations further comprise:
based on the at least one remaining device identifier, determining a mapping between media streamed through the device and demographic information of a consumer who is exposed to the media streamed through the device.

* * * * *